(12) United States Patent
Suzuki

(10) Patent No.: US 6,546,826 B2
(45) Date of Patent: Apr. 15, 2003

(54) CONTROL APPARATUS OF AN AUTOMATED MANUAL TRANSMISSION

(75) Inventor: Hosei Suzuki, Tokyo (JP)

(73) Assignee: Fuji Jukogyo Kabushiki Kaisha, Shinjuku-ku (JP)

(*) Notice: Subject to any disclaimer, the term of this patent is extended or adjusted under 35 U.S.C. 154(b) by 0 days.

(21) Appl. No.: 09/986,749

(22) Filed: Nov. 9, 2001

(65) Prior Publication Data

US 2002/0056332 A1 May 16, 2002

(30) Foreign Application Priority Data

Nov. 13, 2000 (JP) ........................................ 2000-344900

(51) Int. Cl.⁷ ............................................... F16H 61/12
(52) U.S. Cl. ....................................................... 74/335
(58) Field of Search ............................... 74/335, 336 R, 74/336.5, 337

(56) References Cited

U.S. PATENT DOCUMENTS

| | | | | | |
|---|---|---|---|---|---|
| 3,766,793 A | * | 10/1973 | Knop | .......................... | 74/335 |
| 3,808,903 A | * | 5/1974 | Sauer | .......................... | 74/335 |
| 4,311,062 A | * | 1/1982 | Hamada et al. | ................ | 74/337 |

FOREIGN PATENT DOCUMENTS

| | | |
|---|---|---|
| JP | 2703169 | 10/1997 |
| JP | 2000-55184 | 2/2000 |

* cited by examiner

Primary Examiner—Sherry Estremsky
(74) Attorney, Agent, or Firm—McGinn & Gibb, PLLC

(57) ABSTRACT

A control apparatus of an automated manual transmission has an input shaft provided with a plurality of drive gears, an output shaft provided with a plurality of driven gears engaged with the drive gears, and actuators for switching a transmission gear train to transmit a power from the input shaft to the output shaft. A hydraulic pressure system is provided with a control valve for regulating hydraulic pressure supplied to actuators, and an accumulator for saving working fluid and storing pressure energy. An electronic control unit determines that there occurs a trouble in the hydraulic pressure system when a rising rate of hydraulic pressure is lower than a predetermined value (S2, S3). Then, the electronic control unit switches a transmission gear train to the lowest speed gear range within a scope of no over-revolution of an engine through using pressure energy stored in the accumulator (S7, S8). Thereby, even when there occurs a malfunction in the hydraulic pressure system, a minimum drive ability can be ensured with a simple structure.

3 Claims, 3 Drawing Sheets

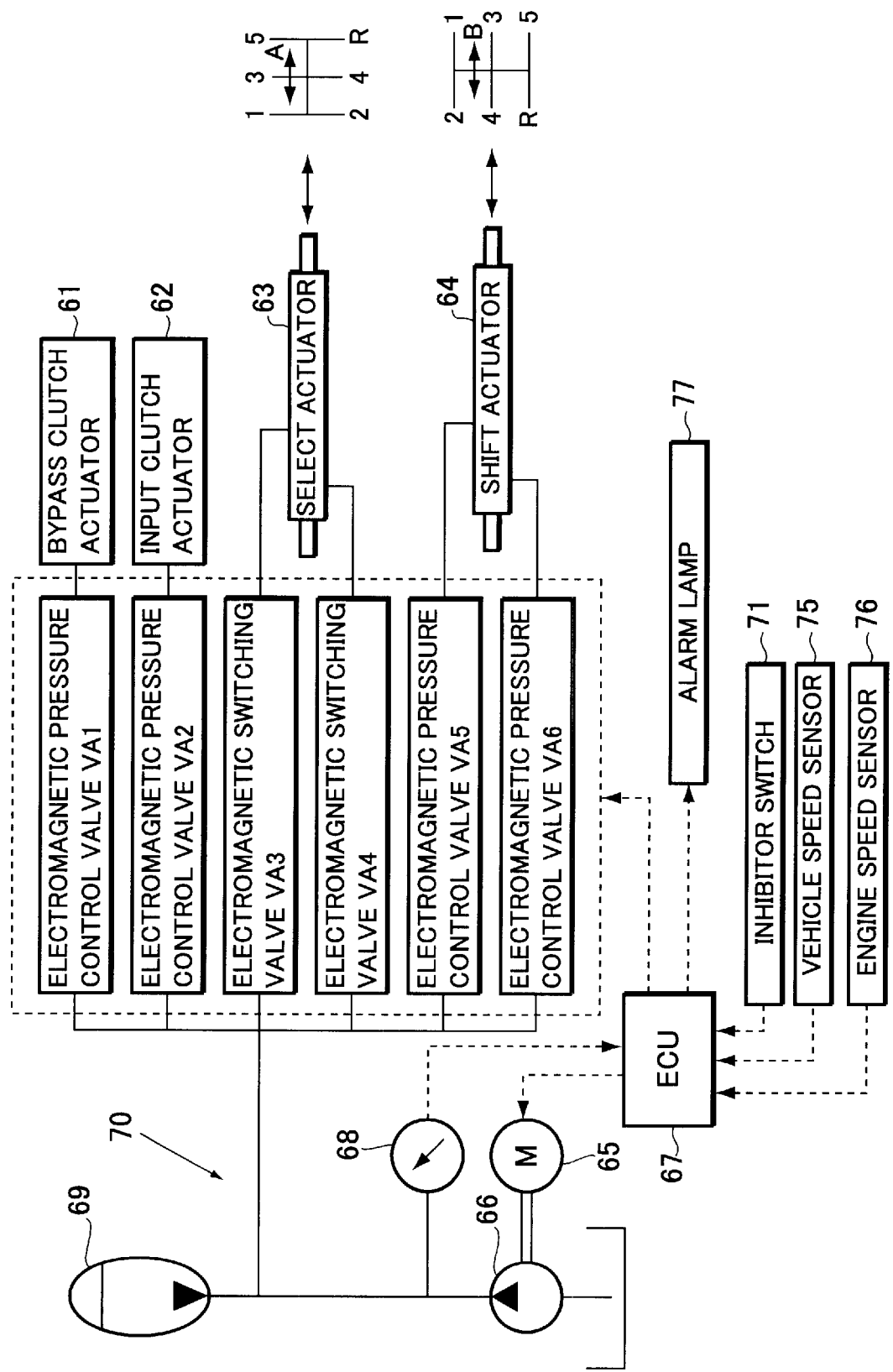

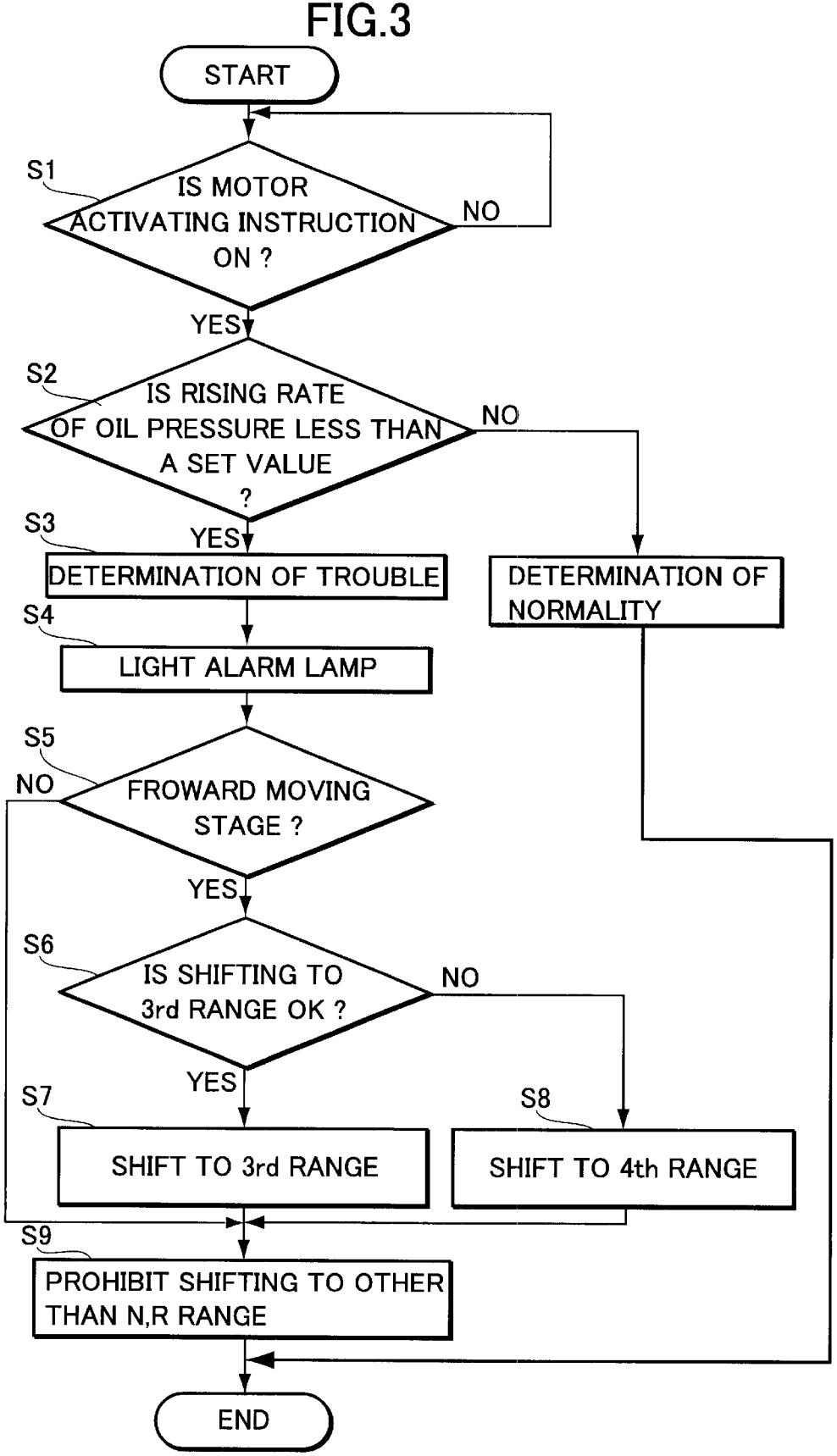

# CONTROL APPARATUS OF AN AUTOMATED MANUAL TRANSMISSION

BACKGROUND OF THE INVENTION

The present invention relates to a control apparatus of an automated transmission mounted on a motor vehicle, and more particularly to the apparatus applied to the automated transmission having a plurality of transmission gear trains.

A manual type transmission (MT) for executing a gear change operation by a manual operation of a driver includes an input shaft connected to an engine and to which a plurality of drive gears are attached, and an output shaft connected to a drive wheel and to which a plurality of driven gears forming pairs together with the drive gears are attached, in which a plurality of transmission gear trains are provided between the input and output shafts. In the MT, a gear change operation, i.e., a shift change is performed through manually operating a switching mechanism such as a synchromesh mechanism for switching a gear train to another gear train in a plurality of transmission gear trains after disengaging a clutch at a time of changing gear, thereafter connecting the clutch to complete the gear change operation.

When automatically executing the shift change and the clutch operation by a hydraulic actuator, it is possible to obtain an automated manual transmission based on a structure of a manual type transmission. This type of automated manual transmission has an advantage that the number of the parts can be reduced in comparison with a normal torque converter type automatic transmission (AT) having a planetary gear in an automatic gear change mechanism so as to make it easy to lighten, and an advantages that a power transmitting efficiency of a drive system is higher than that of the automatic transmission of the normal torque converter type.

As this type of automated manual transmission (hereinafter, simply referred to as AMT) having a plurality of transmission gear trains, there is a structure having a main clutch provided between a crankshaft and an input shaft and switching thereof from an engaged condition to a disengaged condition, and vice versa, and a hydraulic bypass clutch of a multi-disc type for preventing a torque disconnection from the input shaft to the output shaft at the time of the gear change operation. For example, such an AMT is disclosed in Japanese Patent No. 2703169, in which an operation of the clutch in the manual type transmission is automated by a hydraulically driven actuator.

In the AMT, the structure is made such that one gear pair for transmitting a power is suitably switched by the synchromesh mechanism, and the engaged gear pair are switched while transmitting the torque from the input shaft to the output shaft by switching the bypass clutch to a connection state at the time of changing gear, thereby intending to prevent the torque disconnection at the time of the gear change operation.

However, in such an AMT, working fluid can not be supplied to actuators for performing a shift operation when there occurs a malfunction in a hydraulic pressure system including an oil pump as a hydraulic pressure generating source. As a result, there may occur a fear that a gear change operation can not be performed. Then, Japanese Patent Application Laid Open No. 2000-55184 discloses a return spring mounted on the actuator, which functions to shift a current gear range to a predetermined gear range for ensuring a safety travelling when an operating force due to hydraulic pressure is lost by a malfunction.

However, the conventional apparatus need to provided the return spring on the actuator, in which there is a problem that the structure of the apparatus becomes complicated. In addition, when the hydraulic pressure can not be supplied, the shift change is performed through forcibly moving a sleeve of a dog clutch or the synchromesh mechanism with the return spring. Accordingly, the conventional way has a drawback that the shift change can not be performed to gear ranges other than the gear range provided with the return spring, that is, function during a malfunction of the hydraulic pressure system is limited.

In other words, for example, if the return spring is set on the first speed gear range and there occurs a trouble of the hydraulic pressure system when travelling with high speed on an express-highway, an over-revolution of the engine causes a quick deceleration, or a burning of a starting clutch may occur due to a half-clutch. To the contrary, if the return spring is set on the fifth speed gear range and there occurs such a trouble when travelling with low speed, the engine speed may be extremely lowered to cause an engine stop, or the travelling of vehicle may stop due to a shortage of driving force since the starting clutch is in a state of half-clutch.

SUMMARY OF THE INVENTION

An object of the present invention is to enable a motor vehicle to keep a minimum travelling performance with a simple structure even when a malfunction of the hydraulic pressure system occurs.

In accordance with the present invention, there is provided a control apparatus of an automated manual transmission comprising an input shaft provided with a plurality of drive gears, an output shaft provided with a plurality of driven gears engaged with the drive gears, and actuators for switching a transmission gear train to transmit a power from the input shaft to the output shaft, the actuator being hydraulically driven comprising a hydraulic pressure generating source for generating hydraulic pressure of working fluid, a control valve for regulating the hydraulic pressure of working fluid for supplying to the actuators, pressure storing means for saving the working fluid supplied from the hydraulic pressure generating source and storing pressure energy, the pressure storing means being located between the control valve and the hydraulic pressure generating source, and transmission control means for switching the transmission gear train to a predetermined gear range with the pressure energy stored in the pressure storing means when a trouble of a hydraulic pressure system for supplying the working fluid occurs.

According to the present invention, even when any trouble occurs in the hydraulic pressure system, the working fluid can be supplied to the actuators since the hydraulic pressure is stored in an accumulator as pressure storing means, so that a minimum drive ability can be ensured even in such an emergency situation.

Further, the present invention is characterized in that the transmission control means determines that there occurs the trouble in the hydraulic pressure system due to a malfunction of the hydraulic pressure generating source when a rising rate of the hydraulic pressure in the working fluid is lower than a predetermined value in spite of an activating instruction sent to the hydraulic pressure generating source. Thereby, the malfunction of the hydraulic pressure generating source can be diagnosed without using a particular detecting device and with a cheap cost and accuracy.

In addition, the present invention is characterized in that the transmission control means switches the transmission gear train to the lowest speed gear range within a scope of no over-revolution of engine when the trouble in the hydraulic pressure system is detected. Thereby, in the both cases of high speed and low speed drives, there does not occur a disadvantage such as a quick deceleration, so that a safety traveling can be ensured.

BRIEF DESCRIPTION OF THE DRAWINGS

The objects and advantages of the present invention will become understood from the following description with reference to the accompanying drawings, wherein:

FIG. 2 is a block diagram showing an example of a hydraulic control circuit for driving the transmission as shown in FIG. 1; and FIG. 3 is a flowchart showing a control process of a case where the hydraulic pressure system is in trouble in the transmission as shown in FIG. 1.

DETAILED DESCRIPTION OF THE PREFERRED EMBODIMENT

Figure 1:
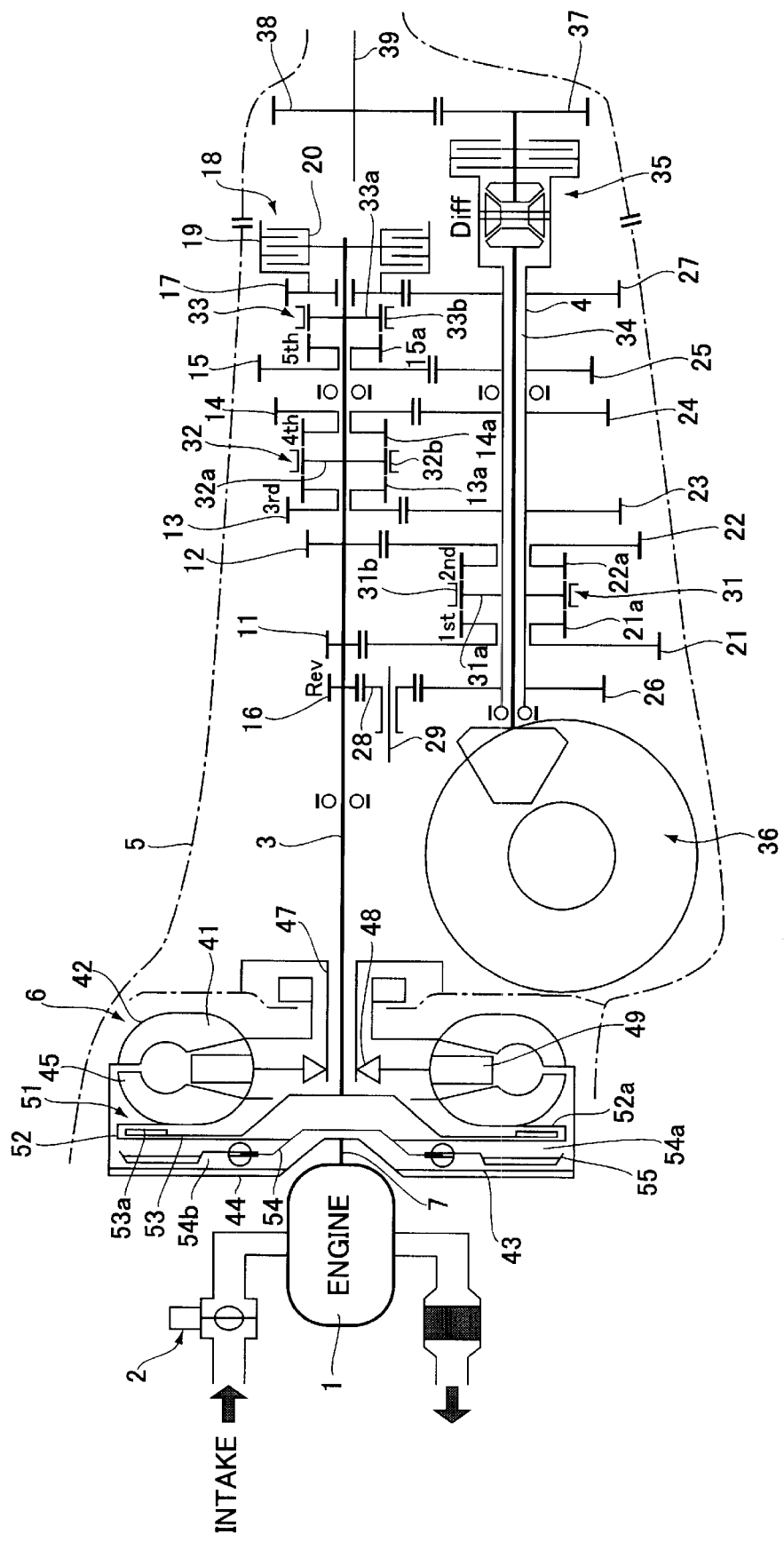
FIG. 1 is a skeleton view showing a control apparatus of a transmission in accordance with an embodiment of the present invention.

An embodiment of the present invention will be explained in detail with reference to the accompanying drawings. FIG. 1 is a skeleton view showing a control apparatus of a transmission in accordance with the embodiment of the present invention.

An engine 1 as shown in FIG. 1 is provided with an electronic control throttle valve 2 for adjusting an engine torque and an engine speed, and normally an engine control is executed by opening and closing the electronic control throttle valve 2 based on an output signal according to a depressing amount of an accelerator pedal (not shown) from an electronic control apparatus. Further, the electronic control throttle valve 2 can be opened and closed on the basis of a map previously set in accordance with a detected operation state, without relation to the depressing amount of the accelerator pedal as mentioned above, thereby executing an engine control.

Further, longitudinally arranged in the vehicle is a power transmitting apparatus for transmitting a power generated by the engine 1 to drive wheels, which includes an input shaft 3 connected to the engine 1, and an output shaft 4 arranged in parallel to the input shaft 3 and connected to the drive wheels. All the elements are assembled within a transmission case 5 so as to be directed to a forward moving direction of the vehicle. The input shaft 3 is connected to a crankshaft 7 of the engine 1 via a torque converter 6.

First speed and second speed drive gears 11 and 12 are fixed to the input shaft 3, and third to fifth drive gears 13 to 15 are rotatably mounted thereto. First and second speed driven gears 21 and 22 are rotatably mounted on the output shaft 4, and third to fifth speed driven gears 23 to 25 are fixed thereon. The respective drive gears 11 to 15 are engaged with the corresponding driven gears 21 to 25 so as to form a transmission gear train, and the gear change operation is executed by switching the transmission gear train which transmits a power. A drive gear 16 for a reverse moving is further fixed to the input shaft 3.

A first synchromesh mechanism 31 is provided between the first speed driven gear 21 and the second speed driven gear 22 of the output shaft 4. A second synchromesh mechanism 32 is provided between the third speed drive gear 13 and the fourth speed drive gear 14 of the input shaft 3, and a third synchromesh mechanism 33 is provided adjacent to the fifth speed drive gear 15 of the input shaft 3.

The synchromesh mechanism 31 includes a synchronous hub 31a fixed to the output shaft 4 and a synchronous sleeve 31b always engaging therewith. When engaging the synchronous sleeve 31b with a spline 21a integrally formed in the first speed driven gear 21, a transmission gear ratio is set to a first speed gear range, and on the other hand, when engaging with a spline 22a integrally formed in the second speed driven gear 22, it is set to a second speed gear range.

The other synchromesh mechanism 32 and 33 include synchronous hubs 32a and 33a fixed to the input shaft 3 and synchronous sleeves 32b and 33b always respectively engaging therewith, and are respectively engaged with any of the corresponding splines 13a, 14a and 15a, whereby each transmission gear ratio is set to a third speed gear range to a fifth speed gear range.

A driven gear 26 for reverse moving is mounted on the output shaft 4, and a reverse idler gear 28 is provided between the drive gear 16 and the driven gear 26 so as to freely rotate with respect to an idle shaft 29. The reverse idler gear 28 is slidably attached to the idler shaft 29 so as to freely move between a position engaging with the gears 16 and 26 and a position removing from the engagement. Accordingly, when a reverse mode, i.e., a reverse moving stage is selected, the reverse idler gear 28 slides in an axial direction, the drive gear 16 and the driven gear 26 are engaged with each other via the reverse idler gear 28, and the rotation of the input shaft 3 is transmitted to the output shaft 4 so as to be changed in a reverse direction. The reverse idler gear 28 and the synchromesh mechanisms 31 to 33 are structured so as to be driven by a hydraulic actuator. In this transmission, no synchromesh mechanism is provided in the gear train of the reverse moving gears, but it may be provided.

The output shaft 4 is formed as a hollow shaft, a front wheel output shaft 34 is assembled in an inner portion thereof, the output shaft 4 and the front wheel output shaft 34 are connected by a center differential apparatus 35, and the front wheel output shaft 34 is connected to a drive shaft (not shown) for the front wheels via a front differential apparatus 36. Further, the center differential apparatus 35 is connected to a rear wheel output shaft 39 via a drive gear 37 and a driven gear 38, and the rear wheel output shaft 39 is connected to a drive shaft (not shown) for the rear wheels via a rear differential apparatus (not shown).

A bypass gear 17 in a drive side is rotatably mounted on the input shaft 3, and a bypass gear 27 in a driven side is fixed to the output shaft 4. The gears 17 and 27 are always engaged with each other with keeping a predetermined gear ratio. A bypass clutch 18 is provided at the input shaft 3, and the bypass clutch 18 includes a clutch hub 20 fixed to the input shaft 3 and a clutch drum 19 fixed to the bypass gear 17. The power from the input shaft 3 is transmitted to the output shaft 4 via the bypass clutch 18 by pressing a plurality of drive and driven clutch discs alternately provided in the clutch drum 19 and the clutch hub 20.

The torque converter 6 includes an outer shell 42 provided with a pump impeller 41 and a front cover 43 fixed thereto, and the front cover 43 is fixed to a drive plate 44 integrally provided with the crankshaft 7. A turbine runner 45 arranged so as to oppose to the pump impeller 41 is connected to the input shaft 3 via a start clutch, that is, an input clutch 51. The input clutch 51 includes a clutch drum 52 fixed to the turbine runner 45 and a clutch hub 53 directly connected to the input shaft 3, and a clutch disc 53a of the clutch hub 53 is provided as being in contact with a clutch drive disc 52a mounted in the clutch drum 52.

A lockup clutch 54, which is pressed to the front cover 43 so as to transmit an engine torque, is fitted to the input shaft 3 in such a manner as to be capable of transmitting the power. One side of the lockup clutch 54 forms an applying chamber 54a to which a control hydraulic pressure for pressing the lockup clutch 54 to the front cover 43 is supplied, and another side forms a release chamber 54b for releasing an engagement state thereof. Further, the lockup clutch 54 is released by circulating the hydraulic oil supplied to the release chamber 54b via the applying chamber 54a, so that the torque converter 6 is in an operating state. On the other hand, the clutch disc 55 of the lockup clutch 54 is pressed to the front cover 43 to be in a lockup state, by applying the hydraulic pressure to the applying chamber 54a so as to reduce a hydraulic pressure within the release chamber 54b. The lockup clutch 54 is engaged when the vehicle speed becomes equal to or more than a predetermined value on the basis of a map of a vehicle speed, an accelerator pedal opening degree which are previously set in accordance with experiments.

The input clutch 51 is structured so as to be hydraulically controlled independently of a circulating fluid within the torque converter 6. Since the rotation of the turbine runner 45 is transmitted to the input shaft 3 via the input clutch 51, and on the other hand, the lockup clutch 54 is connected to the clutch drum 52, the rotation of the crankshaft 7 is directly transmitted to the input shaft 3 when engaging the lockup clutch 54. Thus, the power from the crankshaft 7 is transmitted to the input shaft 3 via the torque converter 6 or the lockup clutch 54.

The input clutch 51 is assembled within the torque converter 6, and the end portion of the input shaft 3 is positioned at a hollow supporting shaft 47, however, the input clutch 51 may be arranged at the rear of the supporting shaft 47. In this case, an inner portion of the supporting shaft 47 at the input shaft 3 forms a turbine shaft directly connected to the turbine runner 45, and the lockup clutch 54 is fixed to the turbine shaft.

In the transmission as shown in the drawing, the gear change operation and the operation of the bypass clutch 18 and the input clutch 51 are actuated by the hydraulic pressure. Further, the gear change operation is automatically executed on the basis of the map previously set by detecting the vehicle traveling state in accordance with the signals of the engine speed, the accelerator pedal opening degree, the vehicle speed, the speed of the input shaft, and the gear change stage position.

FIG. 2 is a block diagram showing one embodiment of a hydraulic control circuit for controlling an operation of the automated manual transmission as shown in FIG. 1. As shown in FIG. 2, the automated manual transmission includes a bypass clutch actuator 61 for operating the bypass clutch 18 and an input clutch actuator 62 for operating the input clutch 51. Further, the automated manual transmission includes a select actuator 63 and a shift actuator 64 for switching the transmission gear pair transmitting a power among a plurality of gear trains so as to execute the gear change operation. The transmission as shown in FIG. 1 includes totally six speed gear change stages comprising five forward moving stages and one reverse moving stage, and is structured so as to transmit the respective switching movement of the select actuator 63 and the shift actuator 64 to the switching movement of the synchromesh mechanisms 31 to 33 and the reverse idler gear 28 via a direction changing mechanism (not shown).

In this transmission, a working fluid for driving various kinds of actuators is supplied by an oil pump 66 driven with an electric motor 65. The electric motor 65 is controlled by an electronic control unit (hereinafter, referred to as ECU) 67, and a discharge pressure (line pressure) from the oil pump 66 is monitored by a pressure sensor 68.

Signals are inputted to the ECU 67 from an inhibitor switch 71, a vehicle speed sensor 75, and an engine speed sensor 76. In addition, an alarm lamp 77 for informing the driver that a trouble has occurred in a hydraulic pressure system 70 is connected to the ECU 67. The ECU 67 detects a position of the select lever based on the signals from the inhibitor switch 71, a current vehicle speed from the vehicle speed sensor, and an engine speed from the engine speed sensor 76, so that the driving condition of the vehicle can be detected based on the above detected data. According to the detected driving condition, the ECU 67 outputs driving signals to the electric motor 65 if necessary, in which each actuator 61–64 is controlled to be driven by the hydraulic pressure system 70.

Further, as mentioned above, the ECU 67 always monitors the line pressure supplied from the oil pump 66 by the pressure sensor 68, and stops the electric motor 65 in the case that the hydraulic pressure becomes equal to or more than a predetermined value. Thereafter, when the hydraulic pressure decreases by the repeated gear change operations and the line pressure becomes equal to or less than a predetermined value, the electric motor 65 is restarted.

A part of the working fluid supplied from the oil pump 66 is stored in an accumulator (pressure storing means) 69, as shown in FIG. 2. In this case, a sealed container of the accumulator 69 is filled with a gas such as a nitrogen, and then the gas is compressed by pressing the working fluid into the accumulator, so that a pressure energy of the working fluid can be converted into a pressure energy of the gas to be stored. That is, the line pressure is stored in the accumulator 69, thereby stabilizing the line pressure. Further, even in the case that a trouble in the hydraulic system such as a trouble in the pump, and an oil leakage occurs, a minimum emergency operation such as forcibly changing the gear change stage to, for example, a third speed gear range can be secured by the stored pressure in the accumulator 69.

The working fluid is supplied to various kinds of hydraulically operated equipment via an electromagnetic control valve structured by a three-way type valve. That is, the working fluid is supplied to the bypass clutch actuator 61 via an electromagnetic pressure control valve VA1 and to the input clutch actuator 62 via an electromagnetic pressure control valve VA2, from the oil pump 66, respectively. Further, the working fluid is supplied to the select actuator 63 via electromagnetic switching valves VA3 and VA4, and to the shift actuator 64 via electromagnetic pressure control valves VA5 and VA6. Further, the structure is made such that the select lever position is moved in a direction of an arrow A shown in FIG. 2 by controlling the electromagnetic switching valves VA3 and VA4 so as to drive the select actuator 63, and the select lever position is moved in a direction of an arrow B by controlling the electromagnetic pressure control valves VA5 and VA6 so as to drive the shift actuator 64.

In this case, the select actuator 63 is controlled by the electromagnetic switching valves VA3, VA4, while the shift actuator 64 is controlled by the electromagnetic pressure control valve, because a two-position switching operation (a selecting operation) in the A direction can be sufficiently executed by simply pressing by a large operating force until striking against a dead stop, while a three-position switching operation (a shift operation) in the B direction requires a synchronism by the synchronous mechanism. Since an excessive operating force causes an abrasion of a synchronous ring thereof, it is desired to control the operating force itself. Further, since the shift operating force in the B direction is larger than the select operating force in the A direction, loud noises occur at a time of being brought into contact with the dead stop, so that a countermeasure against operating noises is required. Accordingly, in the shift operation, an operation period is divided into three stages by the shift actuator 64, thereby satisfying requirements comprising a rapid shift operation, a protection of the synchronous ring and a reduction of the operating noises. That is, the operating force is adjusted so as to be strong at an initial period, middle at a synchronous period and weak at a terminal period. Accordingly, as the shift actuator 64, an electromagnetic pressure control valve capable of adjusting a supplied hydraulic pressure is used in place of the control valve simply executing only ON and OFF operation of the hydraulic pressure.

In this case, the working fluid from the oil pump 66 is converted into a predetermined hydraulic pressure so as to be supplied to the torque converter 6, the lockup clutch 54, and the respective lubricating portions. Further, in the present embodiment, the oil pump 66 is driven by the motor, but may be driven by the engine 1 via the torque converter 6 in place thereof.

Next, a shift change operation in the transmission of FIG. 1 will be explained. The shift change operation is controlled by the ECU 67. At first, when a neutral position is selected by the select lever provided within the vehicle compartment in a state where the engine is driven, both of the lockup clutch 54 and the input clutch 51 are set in a released state.

When the forward moving stage is selected by the select lever, the ECU 67 controls the electromagnetic pressure control. valve VA2 so as to supply the hydraulic pressure to the input clutch 51, so that the input clutch 51 is in a contact state due to the hydraulic pressure. At this time, in accordance with a priority order of the operation of the input clutch 51, at first, the synchronous sleeve 31*b* is engaged with the spline 21*a* by the shift actuator 64 so as to achieve that the first speed transmission gear train becomes the power transmitting state and thereafter the hydraulic pressure is applied so as to engage the input clutch 51. Accordingly, the power of the engine 1 is transmitted to the 10 input shaft 3 via the torque converter 6 and the input clutch 51, so that the vehicle can travel. At this time, the power is amplified due to a torque amplifying effect of the torque converter 6 so as to be transmitted to the input shaft 3.

In accordance with an increase of the accelerator pedal opening degree, the electronic control throttle valve 2 is opened, and thus, according to an increase of the vehicle speed, the up-shift gear change operation is executed. Also, the down-shift gear change operation is executed in accordance with a reduction of the vehicle speed or a kick-down operation of deeply depressing the accelerator pedal. At this time, the shift change is automatically executed in accordance with a gear change pattern previously programmed in the ECU 67.

When the up-shift operation is executed, the engagement of the bypass clutch 18 is started with maintaining the input clutch 51 in a lock-up state, wherein the control is executed so as to gradually increase a transmitting torque capacity of the bypass clutch 18. Accordingly, for example, at a time of changing the shift from the first speed gear range to the second speed gear range, the engine speed is reduced to a predetermined speed corresponding to the second speed gear ratio by the electronic control throttle valve 2 so as to be synchronized at the same time as gradually increasing the transmitting torque capacity of the bypass clutch 18 while engaging the input clutch 51, whereby the synchronous sleeve 31*b* is engaged with the spline 22*a* of the second speed driven gear 22. Since, at this time, the power is transmitted from the input shaft 3 to the output shaft 4 via the bypass gears 17 and 27 in the drive and driven sides in accordance with the engagement of the bypass clutch 18, and thus the power from the engine 1 is not shut down, it can prevent the torque from declining at a time of changing gear.

On the other hand, the power transmitting apparatus of the present invention can perform a minimum emergency operation even in the case that there occurs a trouble such as malfunction of the electric motor 65 and oil pump 66 in the hydraulic pressure system 70. FIG. 3 is a flowchart showing a control process of the case that the trouble of the hydraulic pressure system 70 occurs in the power transmitting apparatus of FIG. 1.

When the ECU 67 determines that supply of the working fluid is needed in order to drive the input clutch 51, bypass clutch 18, shift actuator 64, and select actuator 63, the ECU 67 outputs an operating signal to the electric motor 65. Then, in a trouble control process of the hydraulic pressure system as shown in FIG. 3, the ECU 67 firstly confirms as to whether a motor activating instruction is issued at a step S1.

Next, when the motor activating instruction is issued for operating any actuator, the step goes to a step S2, in which the ECU 67 checks as to whether the electric motor 65 and oil pump 66 is normally working. That is, a rising rate of hydraulic pressure is detected from a rising value of hydraulic pressure within a predetermined time based on a detected value by the pressure sensor 68, which is compared with a predetermined value previously set. Normally, the rising rate of hydraulic pressure is constant and never less than the predetermined value if the electric motor 65 and oil pump 66 is normally working. However, in the case that, for example, there occurs malfunction in the electric motor 65 or leakage of the working fluid, the rising rate of hydraulic pressure is extremely lowered. Therefore, when the detected rising rate of hydraulic pressure is less than the predetermined value, the step goes to a step S3, in which the ECU 67 determines that there occurred a malfunction in the hydraulic pressure system 70 including the electric motor 65. On the other hand, when the rising rate is over the predetermined value, it is determined that the hydraulic pressure system 70 is normally working, and thus the step terminates.

In such a way, the control apparatus of the present invention diagnoses whether there exists the malfunction of a hydraulic pressure generating source only through the rising rate of the hydraulic pressure without using a particular detecting device, so that the determination of trouble such as malfunction can be performed with a cheap cost and exactness.

When the malfunction is detected at the step S3, the step goes to a step S4, in which the trouble of the hydraulic pressure system is informed a driver of through lighting the alarm lamp 77. Next, the step goes to a step S5, in which it is determined whether a current gear change stage is in a forward moving stage, a neutral range prior to starting the vehicle, or reverse moving stage. If the forward moving stage is detected, the step goes to a step S6. Moreover, if the neutral range or the reverse moving stage is detected at the step S5, the step goes to a step S9, in which a shifting operation to ranges other than the neutral range(N) and the reverse range (R) is prohibited so as not to allow the vehicle to travel with the trouble of the hydraulic pressure system, and then the step terminates.

At the step S6, the current vehicle speed is detected from the vehicle speed sensor 75, and then the engine speed under the situation that the current shift is changed to the third speed gear range is calculated through using the vehicle speed and the gear ratio of the third speed gear range. Next, the calculated engine speed is compared with a predetermined value previously set as a threshold for showing an over-revolution of engine, in which, when it is less than the predetermined value, it is determined that the shift change to the third speed gear range is possible to go to a step S7. At the step S7, the gear change stage is forcibly changed to the third speed gear range. On the other hand, if the engine speed calculated at the step S6 is over the predetermined value, the step goes to a step S8, in which the shift is changed to the fourth speed gear range so as to prevent the over-revolution of engine.

In this case, the shift change operations at the steps S7 and S8 are performed in the case that there occurs any trouble in the hydraulic pressure system 70, where a necessary hydraulic pressure is not supplied from the oil pump 66 to the shift actuator 64 or the select actuator 63 due to the trouble.

However, the control apparatus of the present invention is provided with the accumulator 69 in the hydraulic pressure system 70 as shown in FIG. 2. Even if there occurs any trouble in the supply of hydraulic pressure from the oil pump, the pressure stored within the accumulator 69 enables gear change operations of about five times to be ensured. In other words, even when any trouble is generated in the hydraulic pressure system 70, the hydraulic pressure necessary for the emergency operation is supplied from the accumulator 69, so that a minimum drive ability can be ensured. Also, in the case that the automated manual transmission is provided with the torque converter, a starting performance also can be ensured by the pressure stored within the accumulator 69.

Further, since the operation at the step S6 is performed for avoiding the over-revolution of engine, the shift change can be performed to the lowest speed gear range within the scope of no over-revolution. Therefore, in the both cases of high speed and low speed drives, there does not occur a disadvantage such as a quick deceleration, so that a safety traveling can be ensured.

After changing the shift to the third or fourth speed gear range, the step goes to the step S9, in which a shifting operation to ranges other than the neutral range(N) and the reverse range (R) is prohibited, and the step terminates. That is, after changing the shift to the third or fourth speed gear range, the shift change in the forward moving stage is not allowed even if the driver requests such a shift change, but the shift change to only the neutral or reverse range can be performed. Thereby, since an unnecessary shift change is prohibited while the hydraulic pressure system is in a trouble, the hydraulic pressure stored in the accumulator 69 can be effectively applied.

It should be clearly understood that the present invention is not limited to the embodiment mentioned above, and can be variously modified within the scope of the present invention.

For example, in the malfunction diagnosis as shown in the step S2 of FIG. 3, the failed state of the electric motor 65 may be detected through finding out a disconnection of the motor as well as utilizing the rising rate of hydraulic pressure. Further, the rising rate of hydraulic pressure is calculated based on a relationship between time and hydraulic pressure in the above mentioned embodiment, but a relationship between current quantity supplied to the electric motor 65 and the hydraulic pressure may be applied to obtain the rising rate of hydraulic pressure. In the method, the trouble of hydraulic pressure system 70 is determined when the rising of hydraulic pressure is low in spite of large current quantity. In addition, described in the above embodiment is the shift change to the third or fourth speed gear range which corresponds with engine speed calculated at the step S6, but the shift change to the other gear range may be performed. In this case, not only two ranges such as the third and fourth speed gear ranges but also the ranges to be shifted more than three may be previously set corresponding with the calculated engine speed. Further, the bypass clutch 18 is provided at the input shaft 3, but may be provided at the output shaft 4, or at the intermediate shaft independently located in parallel to the both. Also, the bypass gears 17 and 27 are set to the gear ratio corresponding to the third speed gear range, but may be a gear ratio corresponding to a fourth or fifth speed gear range. As the switching mechanism of the transmission gear ratio, the synchromesh mechanisms 31 to 33 are used, but the structure is not limited to them, and a dog clutch switching or the like may be employed.

In the case of the present embodiment, the number of the gear change stages is set to the forward moving five stages, but the number of the gear change stages may be set to an optional number. Further, the present invention may be applied to the power transmitting apparatus having an auxiliary transmission. The power transmitting apparatus shown in FIG. 1 is for the four-wheel drive vehicle, but the present invention may be also applied to an FF vehicle or an FR vehicle. In addition, the transmission of power transmitting apparatus shown in FIG. 1 is of the longitudinal-arranged type, but the present invention may be also applied to a horizontal-arranged type in which the input shaft and the output shaft are directed in a lateral direction.

According to the present invention, the pressure storing means is arranged between the control valve for activating the actuator and the hydraulic pressure generating source. When there occurs a trouble in the hydraulic pressure, the current gear range is switched to a predetermined gear range with the pressure energy stored in the pressure storing means, in which, that is, the hydraulic pressure stored in the pressure storing means supplies the working fluid to actuators for switching the gear range. Therefore, without using a particular actuator having a complicated structure for doing so, the shift change to the predetermined gear range for safety travelling is possible even when the trouble of hydraulic pressure system is present, so that the minimum drive ability can be ensured.

Further, according to the present invention, the transmission control means determines whether the trouble is present in the hydraulic pressure system based on the rising rate of hydraulic pressure, that is, the malfunction of the hydraulic pressure generating source can be diagnosed without using a particular detecting device and with a cheap cost and accuracy.

Further, the transmission control means of the present invention switches the current shift to the lowest speed gear range within the scope of no over-revolution of engine when any trouble in the hydraulic pressure system is detected. Therefore, in the both cases of high speed and low speed drives, there does not occur a disadvantage such as a quick deceleration, so that a safety traveling can be ensured.

While there have been described what are at present considered to be preferred embodiments of the present invention, as already mentioned above, it will be understood that various modifications may be made thereto, and it is intended that the appended claims cover all such modifications as fall within the true spirit and scope of the invention.

What is claimed is:

1. A control apparatus of an automated manual transmission having an input shaft provided with a plurality of drive gears, an output shaft provided with a plurality of driven gears engaged with the drive gears, and actuators for switching a transmission gear train to transmit a power from the input shaft to the output shaft, said actuator being hydraulically driven, comprising:

a hydraulic pressure generating source for generating hydraulic pressure of working fluid;

a control valve for regulating the hydraulic pressure of working fluid for supplying to said actuators;

pressure storing means for saving the working fluid supplied from said hydraulic pressure generating source and storing pressure energy, said pressure storing means being located between said control valve and said hydraulic pressure generating source; and transmission control means for switching said transmission gear train to a predetermined gear range with the pressure energy stored in said pressure storing means when a trouble of a hydraulic pressure system for supplying the working fluid occurs.

2. The control apparatus according to claim 1, wherein said transmission control means determines that there occurs the trouble in the hydraulic pressure system due to a malfunction of said hydraulic pressure generating source when a rising rate of the hydraulic pressure in the working fluid is lower than a predetermined value in spite of an activating instruction sent to said hydraulic pressure generating source.

3. The control apparatus according to claim 1, said transmission control means switches said transmission gear train to the lowest speed gear range within a scope of no over-revolution of engine when said trouble in the hydraulic pressure system is detected.

* * * * *